United States Patent [19]

Nguyen et al.

[11] Patent Number: 4,486,394

[45] Date of Patent: Dec. 4, 1984

[54] ALKALI REGENERATION PROCESS

[75] Inventors: Kien L. Nguyen, Traralgon; Andrew J. Keogh, Balwyn; Geoffrey H. Covey, Eltham North, all of Australia

[73] Assignee: Australian Paper Manufacturers Limited, South Melbourne, Australia

[21] Appl. No.: 557,145

[22] PCT Filed: Mar. 24, 1983

[86] PCT No.: PCT/AU83/00035

§ 371 Date: Nov. 1, 1983

§ 102(e) Date: Nov. 1, 1983

[87] PCT Pub. No.: WO83/03407

PCT Pub. Date: Oct. 13, 1983

[30] Foreign Application Priority Data

Mar. 25, 1982 [AU] Australia ................................. PF3311

[51] Int. Cl.$^3$ .............................................. C01D 1/04
[52] U.S. Cl. ...................... 423/155; 162/29; 162/30.1; 162/30.11; 162/32; 162/36; 423/183; 423/207; 423/637; 423/641
[58] Field of Search ............... 423/155, 183, 179, 207, 423/637, 641

[56] References Cited

U.S. PATENT DOCUMENTS

| | | | |
|---|---|---|---|
| 3,796,791 | 3/1974 | Nielsen et al. | 423/175 |
| 3,878,288 | 4/1975 | Commins | 423/175 |
| 4,224,289 | 9/1980 | Covey et al. | 423/207 |

Primary Examiner—John Doll
Assistant Examiner—Wayne A. Langel
Attorney, Agent, or Firm—Bucknam and Archer

[57] ABSTRACT

The invention relates to an improvement in a method of regenerating alkaline or alkaline earth metal oxides or hydroxides from solution particularly in delignification processes wherein a suitable transition metal such as ferric oxide is burnt with the solution to produce a mixed oxide that is subsequently treated in hot water to regenerate the alkaline or alkaline earth metal oxide or hydroxide and precipitate the transition metal oxide. The improvement controls the presence of fines in the transition metal oxide to maintain these at an acceptable level in the fluidized bed combustion zone. This is achieved by contacting the fines with spent liquor from a delignification process. The invention also provides for the pelletization of the fine material of the transition metal oxide and spent delignification liquor can be used as a binder in the formation of such pellets.

8 Claims, No Drawings

ALKALI REGENERATION PROCESS

This invention relates to an improved method of preparing alkali metal hydroxides from alkali metal carbonates or from the spent liquor generated by the alkaline pulping and/or bleaching of cellulosic materials. The method is particularly relevant to the regeneration of sodium hydroxide from the spent liquor generated by the pulping and/or bleaching of cellulosic materials with sodium hydroxide, with or without various pulping aids, and especially when the system is substantially sulphur-free.

A method of recovery of alkali metal hydroxides by reaction with transition metal oxides (particularly ferric oxide) in a fluidized bed and subsequent submergence of the solid product in water is already described in Australian Pat. No. 519,156 (U.S. Pat. No. 4,224,289). This Patent discloses a method of recovering an alkaline or alkaline earth metal oxide or hydroxide from a solution containing organic chemicals and other impurities which compriss burning said solution with an oxide of a suitable transition metal selected from the group consisting of Ti, Fe, Co, Ni, and Mn, to form a product containing a mixed oxide compound of said alkaline or alkaline earth metal and said transistion metal, subsequently washing said mixed oxide in cold water and then submerging the washed solid in water of a higher temperature than said washing step to form a solution of an oxide or hydroxide of an alkaline or alkaline earth metal and a precipitate of said transition metal oxide and subsequently separating said precipitate for recycling to said first addition steps and recovering a solution of said alkaline or alkaline earth metal oxide or hydroxide. This method enables large particles of transition metal oxide to be used, thus permitting the use of high gas velocities in the fluidized bed.

When a method as described in Patent 519 156 is employed there is inevitably some degradation of particle size at various points in the system. For simplicity, the small particles so produced will hereafter be referred to generally as "fine material" irrespective of where in the system they are generated or of their chemical form (be it transition metal oxide, double-oxide of transition metal and alkaline metal). It is comparatively difficult to separate that fine material which is present after the submergence in water from the regenerated alkali metal hydroxide solution or from the water (if any) used to wash the transition metal oxide. This results in losses of alkali metal hydroxide if the fine material is subsequently discarded, or reduction in the thermal efficiency of the process if the fine material is returned to the fluidized bed reaction stage (because of the heat required to evaporate water associated with the fine material). For the same reason it is undesirable to contact fine material from other parts of the system, particularly dust collected from the flue gas, directly with hot water to recover alkali metal hydroxide. Further, in the case of recycled transition metal oxide because of the relatively high gas velocities employed in the fluidized bed, the fine material may be entrained before it has reacted with the compounds of the alkaline metal and so its efficiency of utilization will be reduced. Also, if the fine material is recycled and the losses from the system are small, then the mean size of the transition metal oxide will be progressively reduced and the performance of the system will deteriorate.

It is an object of this invention to reduce the problems presented by the presence or generation of fine material in the regeneration process.

To this end the present invention provides a method of recovering an alkaline or alkaline earth metal oxide or hydroxide from a solution containing an alkaline or alkaline earth metal carbonate, organic chemicals and impurities which comprises burning said solution in a fluidized bed of particles of an oxide of a transition metal selected from Ti, Fe, Co, Ni, and Mn, and maintaining said fluidized bed at or above a temperature of which said alkaline or alkaline earth metal carbonate becomes molten, subsequently recovering a mixed oxide compound of said alkaline or alkaline earth metal and said transition metal from said fluidized bed, submerging said mixed oxide in hot water to form an alkaline or alkaline earth metal oxide or hydroxide and a precipitate of said transition metal oxide and, subsequently separating said precipitate for recycling to said fluidized bed and recovering a solution of said alkaline or alkaline earth metal oxide or hydroxide wherein the fine material in the recycled transition metal oxide precipitate is subjected to contact with spent liquor from a delignification process. Fine material collected from other points in the system whether transition metal oxide, double oxide of transition metal and alkaline metal or a mixture of both, is treated in the same way.

This improvement is partly based on the finding that some of the fine material in the fluidized bed agglomerates to form useful sized particles. These agglomerates are of moderate strength but, on passing through the system, are degraded in size at a substantially higher rate than those particles which are not agglomerates. Therefore, if this method is to be used to permit the reutilization of fine material in the process, it is necessary to enhance the rate of agglomeration.

It has been found that by enhancing the distribution of spent pulping liquor in the fluidized bed by means of a multiplicity of feed points and/or by introducing the spent liquor to the fluidized bed as fine droplets, the rate of agglomeration of fine particles is increased significantly, and in some cases this is the only action which is required to permit re-use of fines.

As stated above, the agglomerates are of inferior strength to naturally occurring material of similar size and in some embodiments of the process the equipment used may result in attrition to the extent that agglomeration is not an adequate means of re-incorporating the fines into the process. In such cases use can be made of the discovery that if some or all of the fine material collected from convenient points in the system is pelletized (after drying if this is necessary for the operation of the pelletizer) without the use of a binding aid other than water and returned to the fluidized bed reaction stage, then, contrary to what would be expected, on leaving the fluidized bed the pellets are sufficiently strong for a substantial proportion to survive subsequent handling and have properties similar to those of large particles. The reason for the development of this strength is not fully understood, but it is believed that the residual alakli metal in the fine material reacts with the transition metal oxide, and/or impurities associated with the transition metal oxide to form compounds which bind the particles together.

If organic compounds, particularly the spent liquor from which the alkali metal hydroxide is to be recovered (as this is convenient), is mixed with the fine material prior to or during the pelletizing stage and the pellets fed to the fluidized bed, then the pellets leaving the bed are much stronger and their strength may be similar to that of the original transition metal oxide particles. The magnitude of the effect varies depending on the transition metal oxide involved, but it is particularly great when ferric oxide is employed. The reason for this unexpected result is uncertain, but it is believed that within the pellets the combustion of the organic material results in reducing conditions which tend to convert the transition metal to a lower oxidation state. In this reduced state the fine particles tend to sinter to form a very strong matrix (e.g. it is well known that hematite readily sinters under suitable reducing conditions). When the combustion of the binding organic material is substantially complete, oxidizing conditions are established inside the pellet and some or all of the transition metal is restored to its original oxidation level and chemical form, but it retains its strongly bonded physical form.

By using this method it is possible to reduce the make-up requirements of the transition metal oxide without the difficulties and disadvantages incurred if fine material is re-used directly.

As in Patent Nos. 486 132, (U.S. Pat. No. 4,000,262) and 519 156 the alkali regeneration can be carried out as part of a Bayer Bauxite process to regenerate sodium hydroxide or more preferably may be used to regenerate alkaline pulping liquors in substantially sulphur free delignification processes or from bleaching liquors used in such processes.

The method of pelletizing with an organic binder can also be used to form strong pellets from iron ores in other processes.

Preferred embodiments of this invention will now be described with reference to the following examples.

EXAMPLE 1

Samples of the fines (mainly sodium ferrite) separated from the exhaust gases of a pilot plant working under the process described in Australian Pat. No. 519 156 were processed in a pan pelletizer using various aqueous solutions to bind the pellets.

The pellets so produced were dried in an oven at 105° C. and then heated at 950° C. for 45 minutes. The pellets were then screened and the mean compression strength of 2–4 mm particles determined with results as shown in Table 1.

TABLE 1

| Binder | Strength of Pellets | |
|---|---|---|
|  | Quantity of Binder Used (kg solution/kg fines) | Mean Compression Strength (kg) |
| Water | 0.15 | 1.1 |
| 160 g/l cane sugar in water | 0.155 | 1.6 |
| 160 g/l cane sugar plus 124 g/l sodium hydroxide in water | 0.17 | 1.8 |
| Spent pulping liquor at 20% solids w/w | 0.15 | 9.4 |

EXAMPLE 2

Natural hematite was crushed, screened and the fraction passing through a 2 mm screen but retained on a 0.25 mm screen introduced at a feed rate of 130 kg/h to a fluidized bed in which spent soda-quinone pulping liquor was being burned by the method described in Australian Pat. No. 519 156. Under these conditions fines smaller than 0.25 mm were entrained from the fluidized bed at an average rate of 40 kg/h.

A similar test was undertaken except that in place of the crushed hematite, hematite fines pelletized in a pan pelletizer with spent soda pulping liquor as a binder were introduced to the fluidized bed at a rate of 150 kg/h of which about 72 kg/h were smaller than 0.25 mm and this fraction would be expected to be entrained from the fluidized bed. Under these conditions fines were entrained from the fluidized bed at an average rate of 54 kg/h.

A similar test was undertaken except that in place of the crushed hematite, fines separated from the exhaust gases from the fluidized bed were pelletized in a pan pelletizer with spent soda pulping liquor as a binder and introduced to the fluidized bed at a rate of 120 kg/h of which about 10 kg/h were smaller than 0.25 mm. Under these conditions fines were entrained from the fluidized bed at an average of 41 kg/h.

EXAMPLE 3

A fluidized bed was operated by the method described in Australian Pat. No. 519 156. Spent soda pulping liquor was introduced to the fluizided region through a water-cooled tube so that the liquor emerged as a continuous stream and there was minimal dispersion of the liquor prior to its contact with the fluidized region. Under these conditions fines were entrained from the fluidized bed at an average rate of 58 kg/h.

A similar test was undertaken except that compressed air was mixed with the spent pulping liquor prior to its passage through the water-cooled tube so that the liquor emerged as a coarse spray and there was greater dispersion of the liquor. Under these conditions fines were entrained from the fluidized bed at an average rate of 32 kg/h.

A similar test was undertaken except that the spent pulping liquor was introduced to the fluidized region through a tube surrounded by another tube with compressed air introduced to the annular space between the tubes so that the shearing action of the air on the emergent stream of liquor produced a fine spray and dispersion of the liquor was further increased. Under these conditions fines were entrained from the fluidized bed at an average rate of 21 kg/h.

We claim:

1. In the method of recovering an alkali or alkaline earth metal oxide or hydroxide from a solution containing an alkali metal or alkaline earth metal carbonate, organic chemicals and impurities which consists of burning said solution in a fluidized bed of particles of an oxide of a transition metal which is a member selected from the group consisting of Ti, Fe, Co, Ni, and Mn, maintaining said fluidized bed at a temperature at which said alkali metal or alkaline earth metal carbonate becomes molten, recovering a mixed oxide compound of said alkali metal or alkaline earth metal and said transition metal from said fluidized bed, submerging said mixed oxide in water at a temperature above 30° C. to form an alkali metal or alkaline earth metal oxide or hydroxide and a precipitate of said transition metal oxide and, subsequently separating said precipitate for recycling to said fluidized bed and recovering a solution of said alkali metal or alkaline earth metal oxide or hydroxide, the improvement which consists of agglomerating the fine material in the recycled transition metal oxide precipitate and fine material from said mixed oxide by contacting with spent liquor from a delignification process prior to or during the fluidized bed combustion stage.

2. The method according to claim 1 wherein spent pulping liquor is introduced into the fluidized zone of the combustion chamber as fine droplets.

3. The method according to claim 1 wherein spent pulping liquor is introduced into the fluidized zone of the combustion chamber from a plurality of inlets.

4. The method according to claim 1 wherein spent pulping liquor is introduced as fine droplets and from a plurality of inlets.

5. The method according to claim 1 wherein the fine material is pelletized prior to introduction into the fluidized bed.

6. The method as claimed in claim 5 wherein the pellets are formed by contacting with a solution of an organic compound as binder.

7. The method as claimed in claim 6 wherein the pellets are formed using water or a solution of an alkali metal or alkaline earth metal as binder.

8. The method according to claim 5 wherein the pellets are formed using spent delignification liquor as a binder.

* * * * *